(12) United States Patent
Imai

(10) Patent No.: US 9,720,224 B2
(45) Date of Patent: Aug. 1, 2017

(54) PROCESSING APPARATUS

(71) Applicant: CANON KABUSHIKI KAISHA, Tokyo (JP)

(72) Inventor: Yoichiro Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/875,929

(22) Filed: Oct. 6, 2015

(65) Prior Publication Data
US 2016/0109698 A1   Apr. 21, 2016

(30) Foreign Application Priority Data

Oct. 15, 2014  (JP) ................................. 2014-211087

(51) Int. Cl.
G02B 26/08 (2006.01)
G02B 26/10 (2006.01)
B23K 26/082 (2014.01)

(52) U.S. Cl.
CPC .......... G02B 26/101 (2013.01); B23K 26/082 (2015.10)

(58) Field of Classification Search
CPC ... G02B 26/105; G02B 26/101; B23K 26/082
USPC ................... 359/196.1–226.2; 250/234–236; 219/121.74, 121.78–121.8; 347/235, 347/243–244, 250, 259–261
See application file for complete search history.

(56) References Cited

U.S. PATENT DOCUMENTS

2012/0098961 A1* 4/2012 Handa ................ G01B 11/2518
348/135

FOREIGN PATENT DOCUMENTS

JP   2001170783 A   6/2001

* cited by examiner

*Primary Examiner* — James Phan
(74) *Attorney, Agent, or Firm* — Rossi, Kimms & McDowell LLP

(57) ABSTRACT

The present invention provides a processing apparatus that processes an object by scanning light on the object, the apparatus comprising a scanning device including a mirror for reflecting the light and configured to scan the light by driving the mirror, and a controller configured to control the scanning device, wherein the controller is configured to obtain, based on a target scanning velocity, an angle of the mirror at which the scanning device is caused to start driving of the mirror, so that an angle of the mirror, at which scanning of the light is started, is a target angle.

6 Claims, 4 Drawing Sheets

PROCESSING APPARATUS

BACKGROUND OF THE INVENTION

Field of the Invention

The present invention relates to a processing apparatus that processes an object by scanning light on the object.

Description of the Related Art

There is a processing apparatus that processes an object by moving, on it, light (laser beam) emitted from a light source. The processing apparatus uses a moving unit (for example, a galvanometer scanner) that moves light on an object by controlling rotation of a mirror that reflects light emitted from the light source. However, a delay (servo delay) may be generated in the moving unit until the rotation velocity of the mirror reaches a target rotation velocity after a command value to start rotation of the mirror is input. If the servo delay is generated, light cannot be moved on the object at the target velocity in the period in which the servo delay is generated, and it may become difficult to process the object with high accuracy.

Japanese Patent Laid-Open No. 2001-170783 proposes a method of generating, in accordance with a servo delay, time-series data representing a cycle in which an object is irradiated with light. In the method described in Japanese Patent Laid-Open No. 2001-170783, the start of driving the mirror and the start of irradiating the object with light can be performed at almost the same timing.

In the processing apparatus, the moving velocity (scanning velocity) of light on an object is sometimes changed in accordance with the processing conditions of the object. In this case, in the method described in Japanese Patent Laid-Open No. 2001-170783, time-series data representing a cycle in which an object is irradiated with light needs to be newly generated every time the scanning velocity is changed. This may complicate processing for controlling scanning of a surface to be measured with light.

SUMMARY OF THE INVENTION

The present invention provides, for example, a technique advantageous in terms of changing in a scanning velocity of light.

According to one aspect of the present invention, there is provided a processing apparatus that processes an object by scanning light on the object, the apparatus comprising: a scanning device including a mirror for reflecting the light and configured to scan the light by driving the mirror; and a controller configured to control the scanning device, wherein the controller is configured to obtain, based on a target scanning velocity, an angle of the mirror at which the scanning device is caused to start driving of the mirror, so that an angle of the mirror, at which scanning of the light is started, is a target angle.

Further features of the present invention will become apparent from the following description of exemplary embodiments with reference to the attached drawings.

DESCRIPTION OF THE EMBODIMENTS

Figure 1:
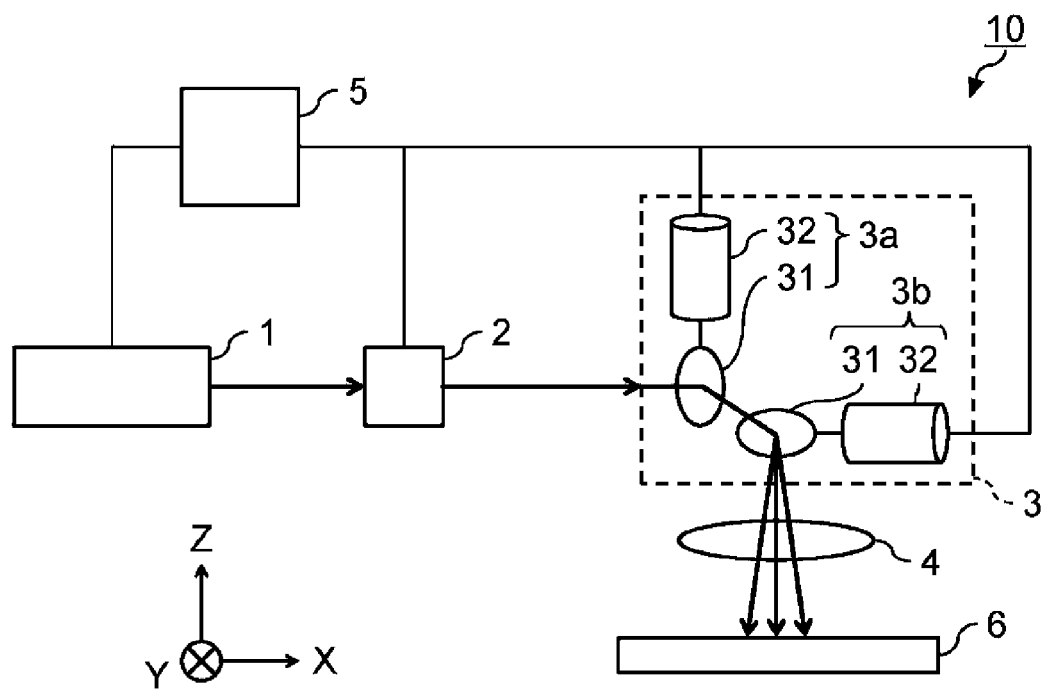
FIG. 1 is a schematic view showing a processing apparatus according to the first embodiment.

Exemplary embodiments of the present invention will be described below with reference to the accompanying drawings. Note that the same reference numerals denote the same members throughout the drawings, and a repetitive description thereof will not be given.

First Embodiment

A processing apparatus 10 according to the first embodiment of the present invention will be described with reference to FIG. 1. FIG. 1 is a schematic view showing the processing apparatus 10 according to the first embodiment. The processing apparatus 10 includes, for example, an emitting unit 1, an adjusting unit 2, a scanning unit 3, an optical system 4, and a control unit 5. The processing apparatus 10 processes an object 6 by moving light (laser beam) emitted from the emitting unit 1 on the object (by scanning the object with light). The control unit 5 includes, for example, a CPU and a memory, and controls processing of the object 6 (controls each unit of the processing apparatus 10).

The emitting unit 1 includes a light source such as a YAG laser, and emits light (laser beam) used to process the object 6. The emitting unit 1 may control emission/non-emission of light by ON/OFF of the light source or by, for example, inserting/retracting a light-shielding member into/from an optical path. The adjusting unit 2 translates the light emitted from the emitting unit 1, and adjusts the position of the optical axis so that the light enters a predetermined position in the scanning unit 3. The scanning unit 3 can be, for example, a galvanometer scanner (to be referred to as a galvano scanner) including a galvanometer mirror (to be referred to as a galvano mirror). The scanning unit 3 can include a first scanning unit 3a for scanning an object with light in the first direction (for example, X direction), and a second scanning unit 3b for scanning the object with light in the second direction (for example, Y direction) different from the first direction. Each of the first scanning unit 3a and the second scanning unit 3b includes a mirror 31 that reflects light emitted from the emitting unit 1, and a driving unit 32 that drives the mirror 31. By driving the mirror 31, each of the first scanning unit 3a and the second scanning unit 3b can scan the object with light reflected by the mirror 31. The optical system 4 (for example, F-θ lens) condenses, at a focal length F, light reflected by the mirror 31 of the first scanning unit 3a and the mirror 31 of the second scanning unit 3b. Each of the first scanning unit 3a and the second scanning unit 3b in the first embodiment includes, for example, a galvano scanner, and is configured to scan an object with light by rotating the mirror 31 by a motor serving as the driving unit 32. However, each of the first scanning unit 3a and the second scanning unit 3b is not limited to this, and may be configured to scan an object with light by, for example, translating the mirror 31.

Figure 2:
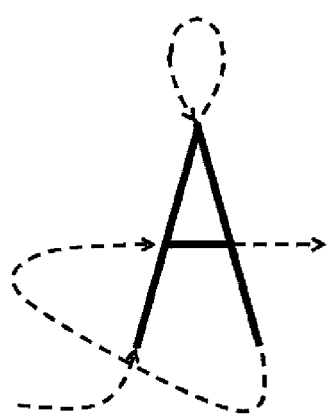
FIG. 2 is a view for explaining processing of an object.

In the scanning unit 3 of the processing apparatus 10 having this arrangement, a delay (servo delay) may be generated until the rotation velocity of the mirror 31 reaches a target rotation velocity after a command value to start driving of the mirror 31 is input. If driving of the mirror 31 by the scanning unit 3 and emission of light from the emitting unit 1 are started at the same timing, scanning with light at a target scanning velocity cannot be started from a target position on an object, and it may become difficult to process the object with high accuracy. Therefore, the processing apparatus 10 (control unit 5) according to the first embodiment causes the scanning unit 3 to start driving the mirror 31 before the emitting unit 1 is caused to start emitting light, so that scanning with light can be started at the target scanning velocity. At this time, the control unit 5 controls the emitting unit 1 and the scanning unit 3 and controls processing of the object based on, for example, data that defines the time (first time) until the emitting unit 1 is caused to start emitting light after the scanning unit 3 is caused to start driving the mirror 31. This data can define, for example, even the irradiating time (second time) from the start to end of scanning with light. For example, when a character "A" is processed on an object by a single stroke, the control unit 5 controls the scanning unit 3 to start driving the mirror 31 before the start of scanning the object with light and processing each line of "A", as shown in FIG. 2.

In the processing apparatus 10, the scanning velocity of light on an object is sometimes changed in accordance with the processing conditions of the object 6. The processing conditions of the object 6 can include, for example, the line width of a pattern to be formed on an object by scanning the object with light, and the state of a burn generated on the object by irradiation with light. In this case, if the emitting unit 1 and the scanning unit 3 are controlled based on already created data without changing an angle of the mirror 31 at which the scanning unit 3 is caused to start driving the mirror 31, it may become difficult to start scanning with light from a target position on the object at which scanning with light should be started. It may also be difficult to set, as a target distance, the distance (processing distance) by which the object is scanned with light.

The processing distance can be represented by a vector distance in a two-dimensional space defined by the X and Y directions. As a generally known calculation method, letting $(x_1, y_1)$ be a position on an object at which scanning with light is started, and $(x_2, y_2)$ be a position on the object at which scanning with light is ended, a processing distance L can be represented by $\{(x_2-x_1)^2+(y_2-y_1)^2\}^{0.5}$. The processing distance may also be represented by a vector distance in a three-dimensional space defined by the X, Y, and Z directions. In this case, letting $(x_1, y_1, z_1)$ be a position on an object at which scanning with light is started, and $(x_2, y_2, z_2)$ be a position on the object at which scanning with light is ended, the processing distance L can be represented by $$\{(x_2-x_1)^2+(y_2-y_1)^2+(z_2-z_1)^2\}^{0.5}.$$

Figure 3:
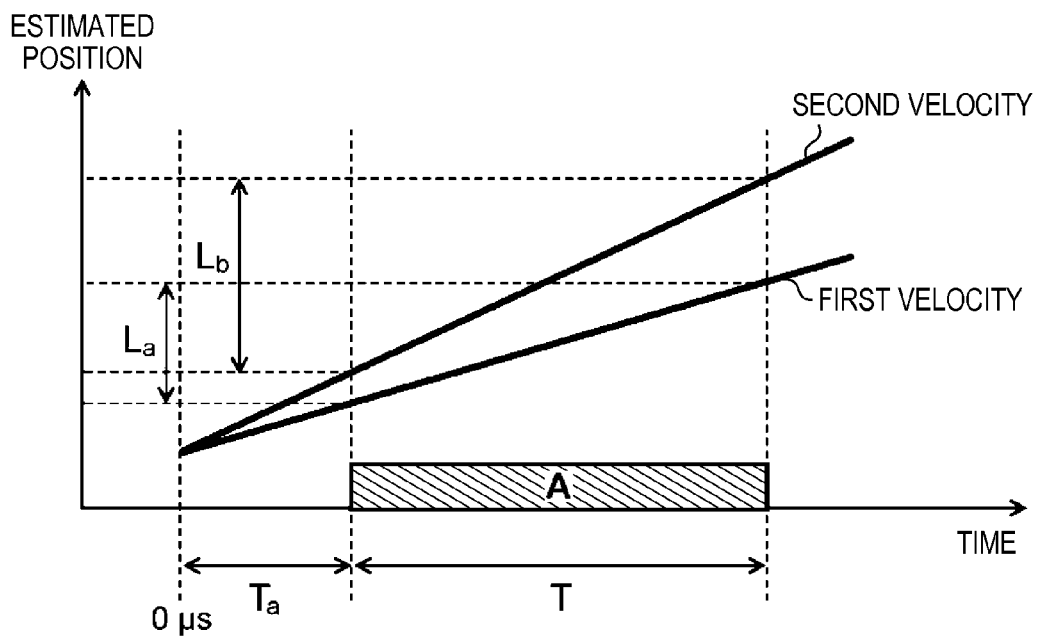
FIG. 3 is a graph for explaining a position at which scanning with light is started, and a processing distance.

FIG. 3 is a graph for explaining a position at which scanning with light is started, and a processing distance in a case in which the target scanning velocity of light on an object is set to be the first velocity (for example, 3,000 mm/s) and a case in which it is set to be the second velocity (for example, 4,000 mm/s). In FIG. 3, the abscissa indicates the time, and the ordinate indicates a position (estimated position) on the object at which the object is estimated to be irradiated with light. Before the emitting unit 1 is caused to emit light, the estimated position is a position on the object at which the object is estimated to be irradiated with light when the emitting unit 1 is assumed to emit light. While the emitting unit 1 is caused to emit light, the estimated position is a position on the object at which the object is estimated to be actually irradiated with light. Either position corresponds to an angle of the mirror 31. Along the abscissa, 0 μs is the time when the scanning unit 3 is caused to start driving the mirror 31. In FIG. 3, a period A is a period in which a command value is supplied to the emitting unit 1 and the emitting unit 1 emits light, that is, a period from the start to end of scanning with light. To simplify the description, FIG. 3 shows a case in which the object is scanned with light in one direction.

For example, a case is assumed, in which the angle of the mirror 31 at which driving of the mirror 31 is started is set to be constant, and an object is scanned with light at each of the first velocity and the second velocity. The emitting unit 1 and the scanning unit 3 are controlled based on the same already created data in both the case in which the object is scanned with light at the first velocity and the case in which it is scanned with light at the second velocity. In this case, as shown in FIG. 3, a position on the object at which scanning with light is started, that is, an angle of the mirror 31 at which scanning with light is started becomes different between the first velocity and the second velocity. A processing distance in the case of scanning with light at the first velocity is a distance $L_a$, and a processing distance in the case of scanning with light at the second velocity is a distance $L_b$. Even the processing distance differs between the first velocity and the second velocity.

To solve this problem, it is considered to newly create data in accordance with the scanning velocity of light every time the scanning velocity of light is changed. However, it is not desirable to newly create data in accordance with the scanning velocity of light because processing of creating the data becomes complicated. Thus, based on the target scanning velocity at which an object should be scanned with light, the processing apparatus 10 according to the first embodiment determines an angle of the mirror 31 at which the scanning unit 3 is caused to start driving the mirror 31, so that an angle of the mirror 31 at which the emitting unit 1 is caused to start emitting light becomes a target angle. The processing apparatus 10 causes the scanning unit 3 to drive the mirror 31 from the determined angle of the mirror 31. Therefore, even when the scanning velocity of light on an object is changed, scanning with light can be started from a target position on the object. Also, based on the target scanning velocity, the processing apparatus 10 determines an adjusting time for adjusting the second time serving as the irradiating time from the start to end of scanning with light, so that the processing distance becomes a target distance. The processing apparatus 10 then corrects data based on the determined adjusting time. By controlling the emitting unit 1 and the scanning unit 3 based on the corrected data, the processing apparatus 10 can process the object 6 with high accuracy.

A method of determining an angle of the mirror 31 at which driving of the mirror 31 is started, and the adjusting time when the scanning velocity of light on an object is changed will be explained below. The following explanation assumes that a first time $T_a$ until the emitting unit 1 is caused to start emitting light after the scanning unit 3 is caused to start driving the mirror 31, and a second time T from the start to end of scanning with light at the first velocity are defined in the data. Also, assume that even an angle (first angle) of the mirror 31 at which the scanning unit 3 is caused to start driving the mirror 31 when the target scanning velocity is the first velocity is defined in the data. A method of determining an angle of the mirror 31 at which driving of the mirror 31 is started, and the adjusting time in the case of scanning with light at a second velocity $V_2$ different from a first velocity $V_1$ will be explained below.

Figure 4:
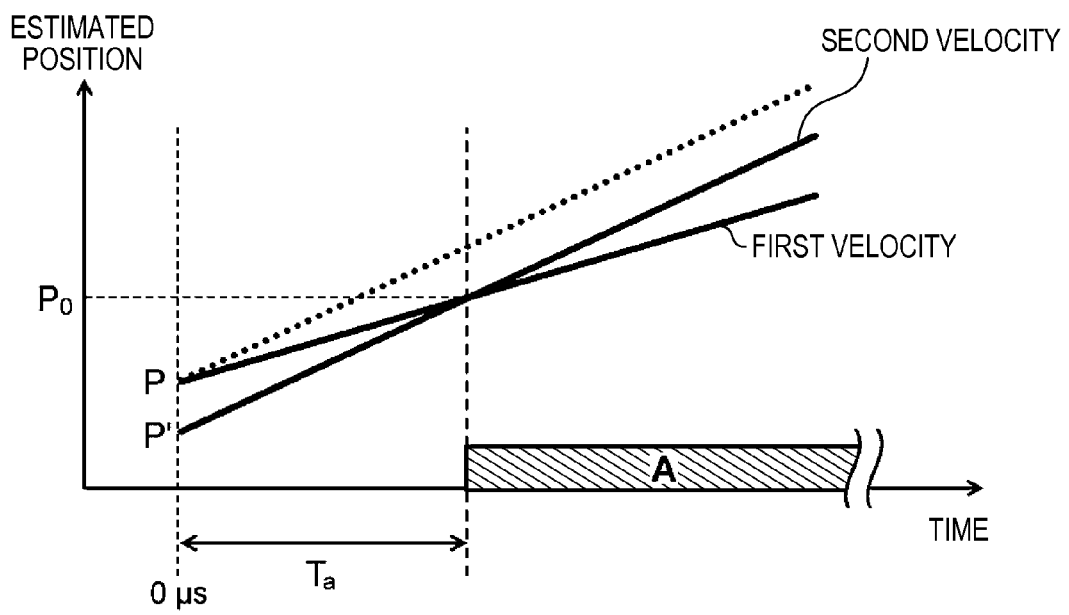
FIG. 4 is a graph for explaining a method of determining an angle of a mirror at which driving of the mirror is started.

First, a method of determining an angle (second angle) of the mirror 31 at which driving of the mirror 31 is started in the case of scanning with light at the second velocity $V_2$ will be explained with reference to FIG. 4. FIG. 4 is a graph for explaining the method of determining an angle of the mirror 31 at which driving of the mirror 31 is started, and is a graph showing the first half in FIG. 3. In FIG. 4, the abscissa indicates the time, and the ordinate indicates the estimated position. The control unit 5 determines an estimated position P' from equation (1) based on data and the second velocity serving as a target scanning velocity at which an object should be scanned with light:

$$P'=(V_1-V_2)\cdot T_a+P \qquad (1)$$

where $V_1$ is the first velocity, $V_2$ is the second velocity, $T_a$ is the first time, and P is the estimated position at the first angle. Based on the estimated position P' determined from equation (1), control unit obtains, as the second angle, an angle of the mirror 31 that corresponds to the estimated position P'. The angle of the mirror 31 that corresponds to the estimated position P' can be obtained based on, for example, information representing the correspondence between the estimated position and the angle of the mirror. The processing apparatus 10 can set, as a target angle, the angle of the mirror at which scanning with light at the second velocity is started, and can start scanning with light at the second velocity from a target position $P_0$ on the object.

Figure 5:
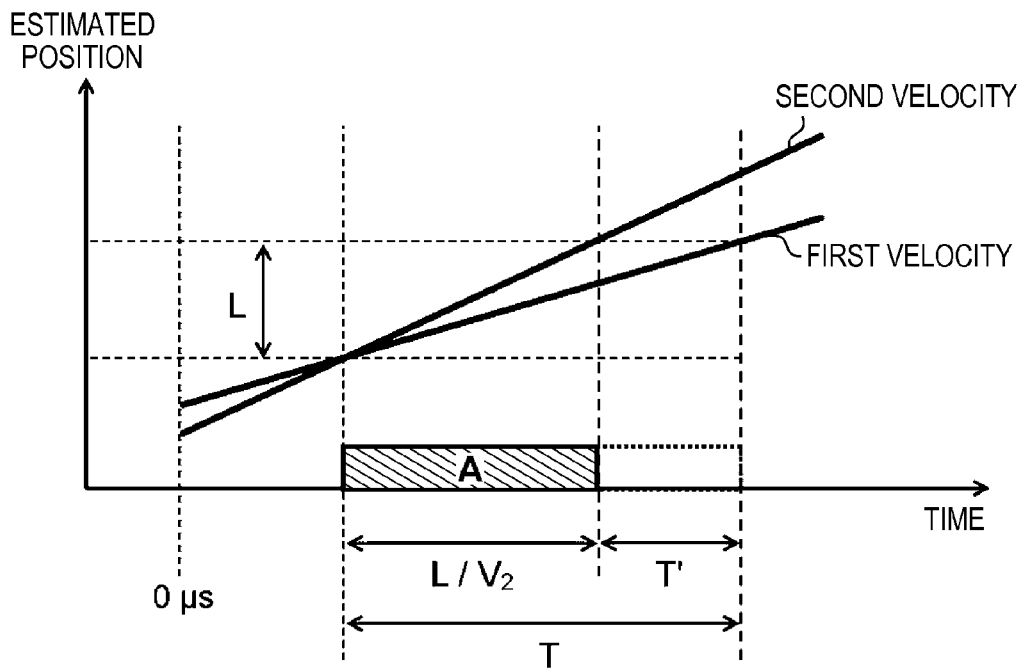
FIG. 5 is a graph for explaining a method of determining an adjusting time.

Next, a method of determining the adjusting time in the case of scanning with light at the second velocity will be explained with reference to FIG. 5. FIG. 5 is a graph for explaining a method of determining the adjusting time. The control unit 5 determines an adjusting time T' from equation (2) based on data and the second velocity serving as a target scanning velocity at which an object should be scanned with light:

$$T'=T-L/V_2 \qquad (2)$$

where T is the second time and L is the target distance. The control unit 5 corrects the data based on the determined adjusting time T', controls processing of the object 6 based on the corrected data, and can scan the object with light so that the processing distance becomes a target distance. In this case, T may include a delay until the emitting unit 1 emits light after a command value is supplied to the emitting unit 1.

As described above, the processing apparatus 10 according to the first embodiment obtains the position P' at which the scanning unit 3 is caused to start driving the mirror, so as to satisfy equation (1) in order to set, as the target scanning velocity, the second velocity $V_2$ different from the first velocity $V_1$. Based on P', an angle of the mirror at which the scanning unit 3 is caused to start driving the mirror is obtained. Also, the processing apparatus 10 obtains the adjusting time T' of the irradiating time so as to satisfy equation (2) in order to set, as the target scanning velocity, the second velocity $V_2$ from the first velocity $V_1$. By controlling processing of an object using the obtained values, the processing apparatus 10 can scan the object with light and process the object with high accuracy. When the scanning unit 3 includes the first scanning unit 3a and the second scanning unit 3b, an angle of the mirror 31 at which driving of the mirror 31 is started, and the adjusting time can be determined for each of the first scanning unit 3a and the second scanning unit 3b.

Second Embodiment

A processing apparatus according to the second embodiment of the present invention will be described. The processing apparatus 10 according to the first embodiment determines, based on a target scanning velocity, an angle of the mirror 31 at which the scanning unit 3 is caused to start driving the mirror 31, so that an angle of the mirror 31 at which the emitting unit 1 is caused to start emitting light becomes a target angle. A processing apparatus according to the second embodiment determines, based on a target scanning velocity, a changed time serving as a time changed from the first time, so that an angle of a mirror 31 at which an emitting unit 1 is caused to start emitting light becomes a target angle. As described above, the first time is the time until the emitting unit 1 is caused to start emitting light after a scanning unit 3 is caused to start driving the mirror 31. The processing apparatus according to the second embodiment determines, based on a target scanning velocity, an adjusting time for adjusting the second time till the end of scanning with light after the start of scanning with light by causing the emitting unit 1 to start emitting light, so that the processing distance becomes a target distance. The processing apparatus corrects data based on the determined changed time and adjusting time, and controls processing of an object based on the corrected data.

A method of determining the changed time and the adjusting time when the target scanning velocity of light on an object is changed will be explained below. The following explanation assumes that a first time $T_a$ until the emitting unit 1 is caused to start emitting light after the scanning unit 3 is caused to start driving the mirror 31, and a second time T from the start to end of scanning with light at the first velocity are defined in data. Also, assume that even an angle of the mirror 31 at which the scanning unit 3 is caused to start driving the mirror 31 in the case of scanning with light at the first velocity is also defined in the data. A method of determining the changed time and the adjusting time in the case of scanning with light at a second velocity $V_2$ different from a first velocity $V_1$ will be explained below. Here, the processing apparatus according to the second embodiment has the same apparatus arrangement as that of the processing apparatus 10 according to the first embodiment, and a description of the apparatus arrangement will not be repeated.

Figure 6:
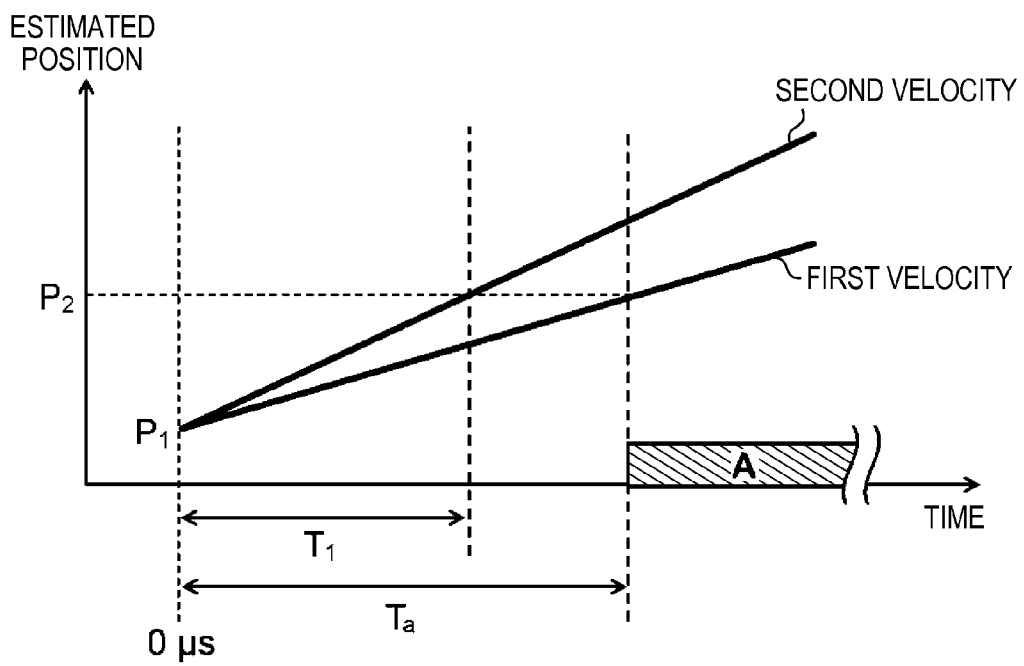
FIG. 6 is a graph for explaining a method of determining a changed time.

First, a method of determining the changed time in the case of scanning with light at the second velocity will be explained with reference to FIG. 6. FIG. 6 is a graph for explaining the method of determining the changed time, and is a graph showing the first half in FIG. 3. In FIG. 6, the abscissa indicates the time, and the ordinate indicates the estimated position. A control unit 5 determines a changed time $T_1$ from equation (3) based on data and the second velocity serving as a target scanning velocity at which an object should be scanned with light:

$$T_1=(P_2-P_1)/V_2 \qquad (3)$$

where $V_2$ is the second velocity, the position $P_2$ is the estimated position at a target angle, and the position $P_1$ is the estimated position when the scanning unit 3 is caused to start driving the mirror 31 in the case of scanning with light at the first velocity. The control unit 5 corrects the data based on the determined changed time $T_1$. For example, the control unit 5 corrects the data to shorten the time from the first time $T_a$ to the changed time $T_1$ (shortening the time by $T_a-T_1$) ($T_a-T_1$ is correction data regarding the time). Hence, the time until the emitting unit 1 is caused to emit light after the scanning unit 3 is caused to start driving the mirror 31 in the case of scanning with light at the second velocity can be obtained. By controlling processing of the object based on the corrected data, the processing apparatus can start scanning with light at the second velocity from a target position $P_2$ on the object.

Figure 7:
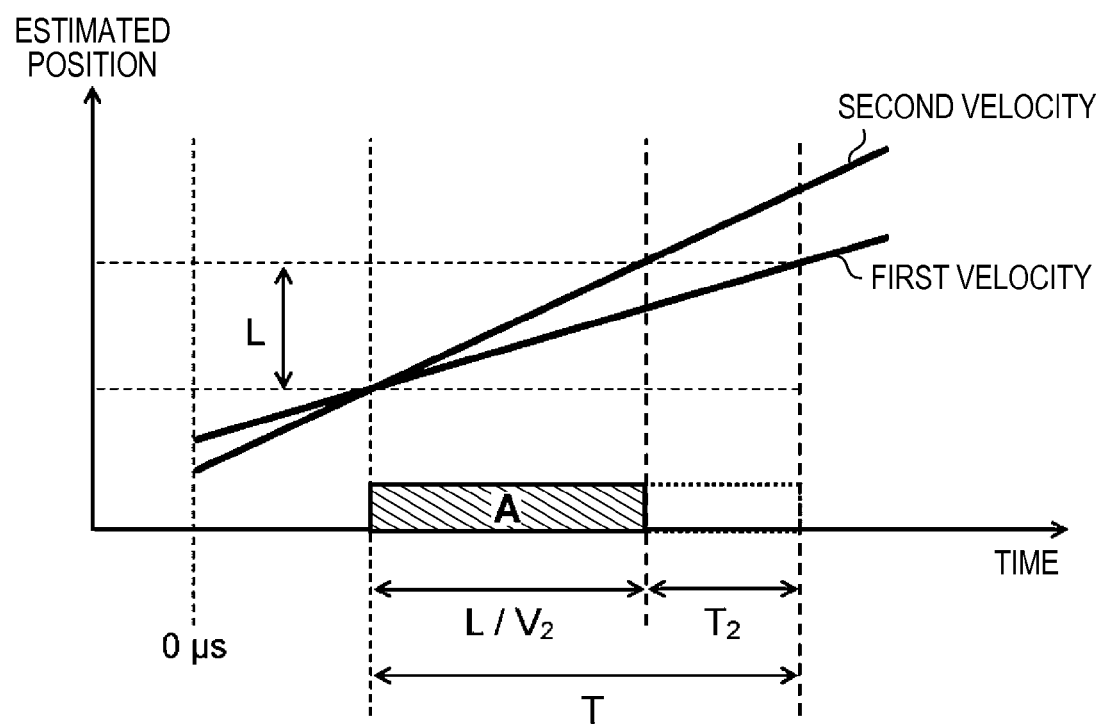
FIG. 7 is a graph for explaining a method of determining an adjusting time.

Next, a method of determining the adjusting time in the case of scanning with light at the second velocity will be explained with reference to FIG. 7. FIG. 7 is a graph for explaining a method of determining the adjusting time. The control unit 5 determines an adjusting time $T_2$ from equation (4) based on data and the second velocity serving as a target scanning velocity at which an object should be scanned with light:

$$T_2 = T - L/V_2 \qquad (4)$$

where T is the second time, and L is the target distance. The control unit 5 corrects the data based on the determined adjusting time $T_2$. By controlling processing of the object based on the corrected data, the control unit 5 can scan the object with light so that the processing distance becomes a target distance. In this case, T may include a delay until the emitting unit 1 emits light after a command value is supplied to the emitting unit 1.

As described above, the processing apparatus according to the second embodiment obtains the changed time $T_1$ till the start of scanning with light after the scanning unit is caused to start driving the mirror, so as to satisfy equation (3) in order to set, as the target scanning velocity, the second velocity $V_2$ different from the first velocity $V_1$. Also, a processing apparatus 10 obtains the adjusting time $T_2$ of the irradiating time so as to satisfy equation (4) in order to set, as the target scanning velocity, the second velocity $V_2$ different from the first velocity $V_1$. The processing apparatus corrects data based on the obtained time, and controls processing of an object using the corrected data. Accordingly, the object can be scanned with light and processed with high accuracy. When the scanning unit 3 includes a first scanning unit 3a and a second scanning unit 3b, the changed time and the adjusting time can be determined for each of the first scanning unit 3a and the second scanning unit 3b.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211087 filed on Oct. 15, 2014, which is hereby incorporated by reference herein in its entirety.

What is claimed is:

1. A processing apparatus that processes an object by scanning light on the object, the apparatus comprising:
   a scanning device including a mirror for reflecting the light and configured to scan the light by driving the mirror; and
   a controller configured to control the scanning device,
   wherein the controller is configured to obtain, based on a target scanning velocity, an angle of the mirror at which the scanning device is caused to start driving of the mirror, so that an angle of the mirror, at which scanning of the light is started, is a target angle.

2. The apparatus according to claim 1, wherein the controller is configured to obtain a position P', at which the scanning device is caused to start driving of the mirror, so as to satisfy:

$$P' = (V_1 - V_2) \cdot T_a + P$$

where the target scanning velocity is a first velocity $V_1$, a position at which the scanning device is caused to start driving of the mirror is P, a time from start of driving of the mirror to start of scanning of the light is $T_a$, and a second velocity different from the first velocity is $V_2$, in order to set the second velocity as the target scanning velocity, and to obtain, based on the position P', an angle of the mirror at which the scanning device is caused to start driving of the mirror, the positions P and P' being positions on the object at which the object is irradiated with the light if it is assumed that the light is scanned.

3. The apparatus according to claim 1, wherein the controller is configured to obtain, based on the target scanning velocity, an irradiating time from start to end of scanning of the light so that a distance, by which the light is scanned, is a target distance.

4. The apparatus according to claim 3, wherein the controller is configured to obtain an adjusting time T' for the irradiating time so as to satisfy:

$$T' = T - L/V_2$$

where the target scanning velocity is a first velocity, the irradiating time is T, the target distance is L, and a second velocity different from the first velocity is $V_2$, in order to set the second velocity as the target scanning velocity.

5. The apparatus according to claim 1, wherein
   the scanning device includes a first scanning device configured to scan the light in a first direction, and a second scanning device configured to scan the light in a second direction different from the first direction, and
   the controller is configured to obtain, with respect to each of the first scanning device and the second scanning device, an angle of a mirror therein at which driving of the mirror is started.

6. The apparatus according to claim 1, wherein the scanning device includes a galvano mirror.

* * * * *